(12) United States Patent
Bertin

(10) Patent No.: US 12,298,127 B2
(45) Date of Patent: May 13, 2025

(54) LINEAR INDUCTIVE POSITION SENSOR

(71) Applicant: SEMICONDUCTOR COMPONENTS INDUSTRIES, LLC, Phoenix, AZ (US)

(72) Inventor: Jacques Jean Bertin, Pocatello, ID (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 538 days.

(21) Appl. No.: 17/666,740

(22) Filed: Feb. 8, 2022

(65) Prior Publication Data

US 2023/0251074 A1 Aug. 10, 2023

(51) Int. Cl.
*G01B 7/00* (2006.01)
*G01D 5/20* (2006.01)

(52) U.S. Cl.
CPC .......... *G01B 7/003* (2013.01); *G01D 5/2086* (2013.01)

(58) Field of Classification Search
CPC ....... G01D 5/206; G01D 5/2086; G01B 7/003
See application file for complete search history.

(56) References Cited

U.S. PATENT DOCUMENTS

| | | | |
|---|---|---|---|
| 6,236,199 B1 | 5/2001 | Irle et al. | |
| 8,453,518 B2 | 6/2013 | Diekmann et al. | |
| 9,528,858 B2 | 12/2016 | Bertin | |
| 10,444,037 B2 | 10/2019 | Bertin | |
| 11,079,291 B2 | 8/2021 | Bertin | |
| 11,112,275 B2 | 9/2021 | Bertin | |
| 2006/0066167 A1 | 3/2006 | Saito et al. | |
| 2006/0233123 A1 | 10/2006 | Lee | |
| 2009/0133867 A1 | 5/2009 | Kuckes | |
| 2010/0319467 A1 | 12/2010 | Diekmann et al. | |
| 2012/0175198 A1 | 7/2012 | Thibault et al. | |
| 2013/0003820 A1 | 1/2013 | Malhan et al. | |
| 2014/0055000 A1 | 2/2014 | Adra | |

(Continued)

OTHER PUBLICATIONS

B. Aschenbrenner and B. G. Zagar "Analysis and Validation of a Planar High-Frequency Contactless Absolute Inductive Position Sensor" in IEEE Trans. ON Instrum. and Meas., Mar. 2015, pp. 768-775.

(Continued)

*Primary Examiner* — Eman A Alkafawi
*Assistant Examiner* — Suresh K Rajaputra
(74) *Attorney, Agent, or Firm* — Brake Hughes Bellermann LLP

(57) ABSTRACT

A position of a target is determined using a linear inductive position sensor that includes a target coil, an excitation coil, two sensors and a Vernier processor. The sensors each include two or more receive coils. The receive coils include multiple twisted loops. In the first sensor, the coils have a first period, with loops offset by first distance. In the second sensor, the coils have a second period, with loops offset by a second distance. The target coil width is a function of the first distance and the second distance. During operation, the coils output voltages in which third, fifth and/or seventh harmonics are cancelled. Based on the voltages, the sensors output respective first and second position signals, from which the Vernier processor calculates the target's position along an axis of the position sensor.

20 Claims, 14 Drawing Sheets

(56) References Cited

U.S. PATENT DOCUMENTS

| | | | |
|---|---|---|---|
| 2014/0167788 A1 | 6/2014 | Fontanet | |
| 2016/0273945 A1 | 9/2016 | Olsak et al. | |
| 2016/0290833 A1* | 10/2016 | Wang | G01D 5/2225 |
| 2017/0166251 A1 | 6/2017 | Shao et al. | |
| 2018/0017695 A1* | 1/2018 | Wang | G01B 7/023 |
| 2018/0029223 A1 | 2/2018 | Kitamura et al. | |
| 2019/0072414 A1 | 3/2019 | Utermoehlen et al. | |
| 2019/0097501 A1 | 3/2019 | Lin et al. | |
| 2020/0088549 A1 | 3/2020 | Shao | |
| 2020/0278190 A1 | 9/2020 | Bertini et al. | |
| 2021/0055135 A1* | 2/2021 | Smith | G01D 5/2275 |
| 2022/0205814 A1* | 6/2022 | Cook | G01B 3/205 |
| 2022/0205815 A1* | 6/2022 | Cook | G01D 5/2053 |
| 2022/0341758 A1* | 10/2022 | Bertin | G01D 5/2073 |

OTHER PUBLICATIONS

PEEC-Based Numerical Optimization of Compact Radial Position Sensors for Active Magnetic Bearings; Andreas Müsing, Claudius Zingerli, Philipp Imoberdorf, Johann W. Kolar, Power Electronic Systems Laboratory, ETH Zürich, Switzerland.

Shao, Lingmin, "Automotive Inductive Position Sensor" (2017). Electronic Thesis and Dissertation Repository. 4569. https://ir.lib.uwo.ca/etd/4569.

* cited by examiner

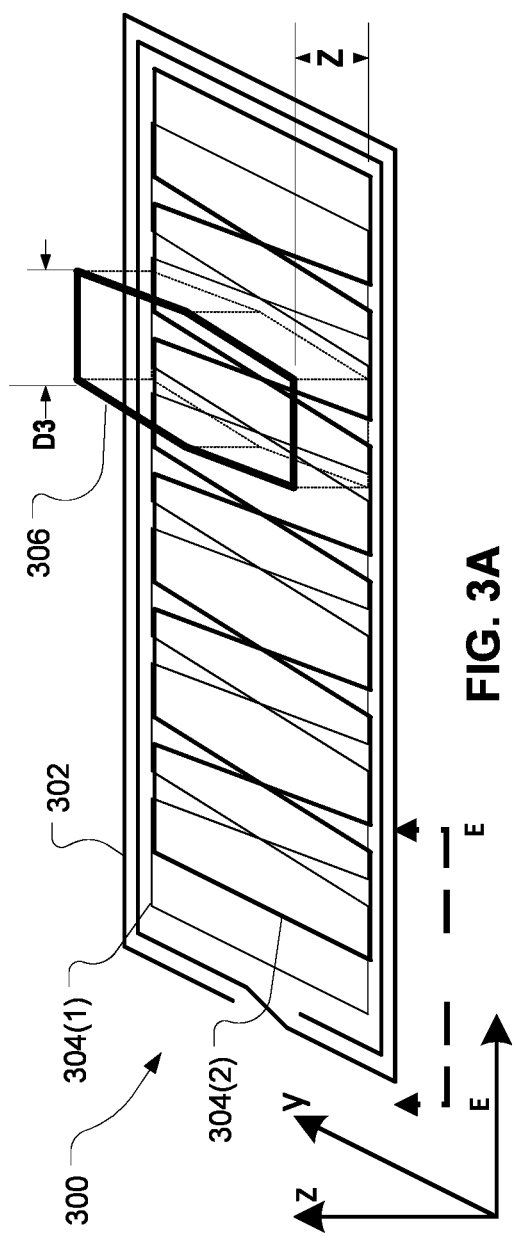

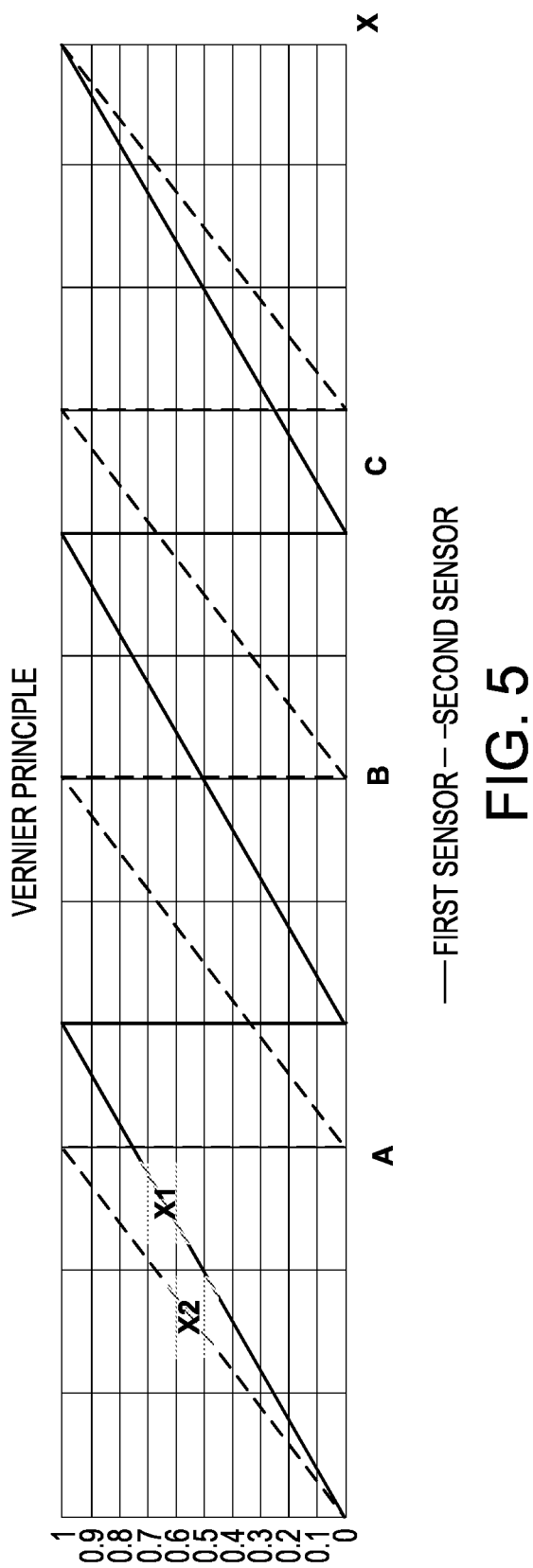

LINEAR INDUCTIVE POSITION SENSOR

TECHNICAL FIELD

The technology described herein generally relates to devices, systems, and methods for determining the position of an object using a linear inductive position sensor.

BACKGROUND

Position sensing devices, including inductive position sensors, are widely used today. Various uses include, but are not limited to, factory settings, industrial robots, and otherwise. Inductive position sensors are often used to determine the position of an object, hereafter defined as a "target." Today, inductive sensors typically include an excitation coil configured to generate an electromagnetic field when an electrical alternating current (AC) flows through the coil, a receiving coil configured to detect an electrical potential, a voltage, induced in the receiving coil by the currents flowing through the excitation coil, and a target. The target is configured to disturb the amount of electrical potential induced in the receiving coil based on the target's position.

For a linear position sensor, the excitation coil, receive coil and the target are typically oriented with respect to a given axis. The axis may be defined to exist in an X-Y-Z coordinate space, such as the X axis. The target may linearly change positions along the given axis while the excitation and receive coils are typically fixed relative to the given axis. Such changes in the linear position of the target uniquely disturb the voltages induced in the receiving coil such that the position of the target can be determined based on the changes in the electrical potential induced in the receiving coil via the target. The inductive coupling between the excitation coil, target, and the receiving coil may be expressed by a series of mathematical functions (each a "transfer function"). Circuitry is connected to a receiving coil to detect and determine a target's relative position based on the relative voltage present in the receiving coil at a given time.

As shown for example in FIG. 1, a linear position sensor 100 often includes an excitation coil 102, a receiver coil 104, and a target coil 106. The excitation coil 102 and the receiver coil 104 are often formed on a single or multiple layer printed-circuit-board (PCB) (not shown). The target coil 106 may be configured to move linearly along the PCB, for example, along the X axis, and relative to the excitation coil 102 and the receiver coil 104. When an AC current having a voltage potential Vx is provided in the excitation coil 102, an excitation magnetic field is generated by a first inductance Lx in the vicinity of the excitation coil 102. The excitation magnetic field induces a current in a second inductance Lt in the target coil 106 based upon a mutual inductive coupling of the excitation coil 102 with the target coil 106. This mutual inductive coupling may be expressed by an excitation-to-target transfer function (Mxt). A receiver coil voltage Vr is also formed by the receiver coil 104 based upon mutual inductances formed by a direct inductive coupling of the receiver coil 104 with the excitation coil 102 and by an inductive coupling of the receiver coil 104 with the target coil 106. These mutual inductances can be respectively expressed by an excitation-to-receiver transfer function (Mxr) and a target-to-receiver transfer function (Mtr). The mutual inductances Mxr and Mtr result in a receiver voltage Vr being generated, where Vr< >0 (zero). When the receiver voltage Vr is sensed by a control circuit, the linear position of the target coil 106 along the given axis may be determined. In short, the receiver voltage Vr is a function of the relative linear position of the target coil 106 relative to the receiver coil 104, along the given axis.

The transfer functions Mxt and Mtr are dependent upon the linear position of the target coil 106 along the given axis and an air gap (Z) formed between the target coil 106 and a top surface of the PCB. The amount of the air gap Z influences the signal strength of harmonic signals formed by the inductive couplings as well as the strength of the primary signal generated in the receiver coil 104. As the air gap Z narrows, the harmonic signals influence on the transfer functions and the linear positional accuracy determinations of a given linear position sensor increases. As the air gap Z widens, the strength of the primary signal generated in the receiver coil 104 decreases. Accordingly, trade-offs are often made for conventional linear position sensors between decreasing effects from harmonics without significantly decreasing the primary signal strength. Various implementations of the present disclosure eliminate one or more of such harmonic signals without decreasing the primary signal strength.

Further, as shown in FIG. 2, linear position sensors may be configured as a multiple linear position sensor arrangement such as one with an excitation coil 102, a target coil 106, a double target having a first double target coil 108(1) and a second double target coil 108(2), a first receiver coil 104(1), and a second receiver coil 104(2). Such multiple linear position sensor arrangements may be susceptible to cross-talk signals between the double target coils 108. Various implementations of the present disclosure reduce the cross-talk signals.

Accordingly, a need exists for linear inductive position sensors that address these and other needs. Such needs and other needs are addressed by one or more of the implementations of the present disclosure.

SUMMARY

The various implementations of the present disclosure relate in general to linear inductive position sensors and systems and methods for manufacturing and use thereof.

In accordance with at least one implementation of the present disclosure a linear inductive position sensor includes an excitation coil extending along a given axis of a substrate forming a portion of the linear inductive position sensor. The sensor further includes a target coil configured to move above the excitation coil and along the given axis of the substrate. The sensor further includes a first sensor extending along the given axis of the substrate. The first sensor may include: a first receiver coil having a first period k, and a second receiver coil, and where a first ratio times the first period k separates the first receiver coil from the second receiver coil along the given axis.

During operation of the linear inductive position sensor, the excitation coil generates a first electromagnetic field while receiving an alternating signal from a power source. The target coil is inductively coupled to the excitation coil by the first electromagnetic field. Due to the inductive coupling of the target coil with the excitation coil, the target coil generates a second electromagnetic field. The first receiver coil is first inductively coupled to the target coil by the second electromagnetic field and the second receiver coil is second inductively coupled to the target coil by the second electromagnetic field. A first receiver voltage Vr1 is generated in the first receiver coil due to the first inductive coupling. Vr1 is dependent upon a current position of the target coil along the given axis. A second receiver voltage Vr2 is generated in the second receiver coil due to the second inductive coupling. Vr2 is dependent upon a current position of the target coil along the given axis. Vr1 and Vr2 are utilized by a first processor to generate a first position signal X1, which provides a scaled representation of a position of the target coil along the given axis of the substrate.

Implementations of the linear inductive position sensor may include one or more of the following features. The excitation coil may extend in a multi loop configuration around a perimeter of the substrate. The first receiver coil and the second receiver coil may be enclosed by the excitation coil. The first receiver coil may include a plurality of first receiver coil loops symmetrically extending from a first portion of the substrate, along the given axis of the substrate, to a second portion of the substrate and back to the first portion of the substrate. One or more of the first receiver coil loops may be respectively offset from another loop of the plurality of first receiver coil loops by a first distance D1.

For an implementation, the second receiver coil may include a plurality of second receiver coil loops, corresponding in symmetry with a plurality of first receiver coil loops. Even numbered harmonics generated in Vr1 and Vr2 may be nullified. The plurality of first receiver coil loops may occur over a multiple of the first period k. The plurality of second receiver coil loops may be offset by at least one of one-quarter and one-third of the first period $\lambda$. The first distance D1 may be equal to one-fourteenth of the first period, i.e., $D1=(1/14)*\lambda$. For an implementation, D1=6 mm.

For an implementation, the first sensor may include a third receiver coil that includes a plurality of third receiver coil loops corresponding in symmetry with a plurality of first receiver coil loops and a plurality of second receiver coil loops. The plurality of third receiver coil loops may be respectively offset from a corresponding loop of the plurality of second receiver coil loops by one-third of the first period $\lambda$. The third receiver coil may be third inductively coupled to the target coil by the second electromagnetic field. A third receiver voltage Vr3 is generated in the third receiver coil due to the third inductive coupling. Vr3 is dependent upon a current position of the target coil along the given axis and Vr1, Vr2, and Vr3 are utilized by the first processor to generate the first position signal.

For an implementation, the second sensor first receiver coil may be fourth inductively coupled to the target coil by the second electromagnetic field. The second sensor second receiver coil may be fifth inductively coupled to the target coil by the second electromagnetic field. A second sensor first receiver coil voltage Vr1' may be generated in the second sensor due to the fourth inductive coupling. A second sensor second receiver coil voltage Vr2' may be generated in the second sensor due to the fifth inductive coupling. Vr1' and Vr2' are utilized by a second processor to generate a second position signal X2. Vr1' and Vr2' are dependent upon a current position of the target coil along the given axis.

For an implementation, the second sensor further may include a second sensor third receiver coil. The second sensor first receiver coil may be separated, along the given axis, from the second sensor second receiver coil by a first ratio times a second period $\lambda 2$ and the second sensor second receiver coil may be separated, along the given axis, from the second sensor third receiver coil by the first ratio times the second period $\lambda 2$.

For an implementation, the second sensor first receiver coil may extend a second period $\lambda 2$ along the given axis and further may include: a second sensor first receiver coil first loop; and a second sensor first receiver coil second loop. A second distance (D2) separates the second sensor first receiver coil first loop from the second sensor first receiver coil second loop. The second sensor first receiver coil first loop may symmetrically extend, in a twisted loop configuration, from a first portion of the substrate, along the given axis of the substrate, to a second portion of the substrate and back to the first portion of the substrate. The second sensor first receiver coil second loop may symmetrically extend in the twisted loop configuration.

For an implementation, the second sensor second receiver coil further may include: a second sensor second receiver coil first loop which symmetrically extends in a twisted loop configuration. A second sensor second receiver coil second loop may also symmetrically extend in a twisted loop configuration. The second sensor second receiver coil first loop may be offset from the second sensor second receiver coil loop by the second distance D2.

For an implementation, the second sensor third receiver coil further may include a second sensor third receiver coil first loop symmetrically extending in the twisted loop configuration. A second sensor third receiver coil second loop may also symmetrically extend in the twisted loop configuration. The second sensor third receiver coil first loop may be offset from the second sensor third receiver coil loop by the second distance D2. The second sensor first receiver coil first loop and second loop occur may over a second period $\lambda 2$. The second sensor second receiver coil first loop and second loop may occur over the second period $\lambda 2$. The second sensor third receiver coil first loop and second loop may occur over the second period 2. For an implementation, the second distance, D2 equals one-tenth of the second period, i.e., $D2=(1/10)*\lambda 2$. When using an implementation of the inductive linear position sensor one or more of third harmonic signals, fifth harmonic signals, and seventh harmonic signals may be cancelled.

For at least one implementation of the present disclosure, a linear inductive position sensor may include an excitation coil extending along a given axis of a substrate forming a portion of the linear inductive position sensor. The sensor may include a target coil configured to move above the excitation coil and along the given axis of the substrate, where the target coil has a width of a third distance D3. When provided with an alternating current, the excitation coil may inductively couple to the target coil. The sensor may include a Vernier processor and a first processor coupled to the Vernier processor. The sensor may include a plurality of first sensor receiver coils, coupled to the first processor. One or more of the plurality of first sensor receiver coils may include a plurality of first sensor twisted loops. The loops may symmetrically extend from a first portion of the substrate, along the given axis of the substrate, to a second portion of the substrate and back to the first portion of the substrate.

The sensor may include a plurality of first sensor second twisted loops, corresponding in symmetry with the plurality of first sensor twisted loops and respectively offset from a corresponding loop of the plurality of first sensor twisted loops by a first distance D1. The plurality of first sensor receiver coils may be respectively offset from a preceding first sensor receiver coil by a first period $\lambda$. When operating, voltages are induced in the first sensor receiver coils and, based on such voltages, the first processor outputs a first position signal X1 to the Vernier processor.

For an implementation, a second sensor may be provided and include a second processor coupled to the Vernier processor. The second sensor may include a plurality of second sensor receiver coils, coupled to the second processor, with the plurality of second sensor receiver coils including a plurality of second sensor first twisted loops. These loops may symmetrically extend from the first portion of the substrate, along the given axis of the substrate, to the second portion of the substrate and back to the first portion of the substrate. The second sensor may also include a plurality of second sensor second twisted loops, corresponding in symmetry with the plurality of second sensor first twisted loops and respectively offset from a corresponding loop of the plurality of second sensor first twisted loops by a second distance D2. A given one of the plurality of second sensor receiver coils may be respectively offset from a preceding second sensor receiver coil by a second period $\lambda 2$.

For an implementation, the third distance D3 may be a function of a ratio of the first period k and a ratio of the second period $\lambda 2$. The target coil inductively couples with the first sensor receiving coils and the second sensor receiving coils. Based upon first voltages induced in the first sensor receiver coils, the first processor outputs a first position signal X1 to the Vernier processor. Based upon second voltages induced in the second sensor receiver coils, the second processor outputs a second position signal X2 to the Vernier processor. The first processor may cancel third and fifth harmonics in the first voltages and the second processor may cancel third, fifth and seventh harmonics in the second voltages. Using Vernier principles, the first position signal X1 and the second position signal X2 may be utilized to generate a final position signal P that represents a location of the target coil along the given axis.

For at least one implementation, a method for determining a position of a target using a linear inductive position sensor is described. The method may include receiving a first position signal X1 from a first sensor. The first sensor generates X1 based on a first plurality of first sensor voltage signals respectively induced in a plurality of first receiver coils by a target coil. The method may further include receiving a second position signal X2 from a second sensor. The second sensor generates X2 based on a second plurality of second sensor voltage signals respectively induced in a plurality of second receiver coils by the target coil. The method may further include applying a Vernier calculation to the first position signal X1 and the second position signal X2 to determine a current position of the target coil. During operation of the linear inductive position sensor, the target coil is inductively coupled to an excitation coil extending along a given axis of the linear inductive position sensor.

The method may include use of a linear inductive position sensor that includes a first sensor configured to cancel third harmonics from the first plurality of first sensor voltages signals. The method may further include use of a linear inductive position sensor that includes a second sensor configured to cancel fifth harmonics from the second plurality of second sensor voltage signals. The method may further include use of a linear inductive position sensor that includes a target coil sized to nullify seventh harmonics otherwise present in at least one of the first plurality of first sensor voltage signals and the second plurality of second sensor voltage signals.

BRIEF DESCRIPTION OF THE DRAWINGS

The features, aspects, advantages, functions, modules, and components of the devices, systems and methods provided by the various implementations of the present disclosure are further disclosed herein regarding at least one of the following descriptions and accompanying drawing figures. In the appended figures, similar components or elements of the same type may have the same reference number, such as 108, with an additional alphabetic designator, such as 108a, 108n, or the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

FIG. 3A is a schematic representation of a linear position sensor configured in accordance with at least one implementation of the present disclosure.

FIG. 5 is a chart illustrating one application of the Vernier principle as applied to the linear inductive position sensor of FIG. 4 and in accordance with at least one implementation of the present disclosure.

DETAILED DESCRIPTION

The various implementations described herein are directed to devices, systems, and methods for inductively determining the position of an object using a linear inductive position sensor.

As shown in FIG. 3A and for at least one implementation of the present disclosure, a linear position sensor 300 includes an excitation coil 302, a first receiver coil 304(1) and a second receiver coil 304(2), and a target coil 306.

The excitation coil 302 may be configured on a PCB (not shown), where a top surface of the PCB forms a given axis along the length thereof such that linear position measurements of the target may be determined along all or a portion of the length of the given axis, such as the X axis. The PCB may provide a stator core for the excitation coil 302 and for the receiver coil(s) 304 and is used in generating electromagnetic fields when an AC signal is provided to the excitation coil 302. The target coil 306 may move along the given axis of the PCB, as separated therefrom by the before-mentioned air gap Z.

The excitation coil 302 may include a multi loop design. Any number of loops may be used for the excitation coil 302 with two loops being shown for purposes of illustration. The respective ends of the excitation coil 302 are coupled to a control circuit (not shown) which controls the providing of electrical currents to the excitation coil 302 from a power source (not shown). The control circuit may be coupled to and control one or more switches (not shown) which selectively couple the excitation coil 302 with a power source (not shown). The power source provides an AC signal, which results in the excitation coil 302 generating a first electromagnetic field (not shown). It is to be appreciated that control circuits, switches, and AC sources used with inductive position sensors are well known in the art and any such known or later arising components may be configured for use in an implementation of the present disclosure.

Figure 1:
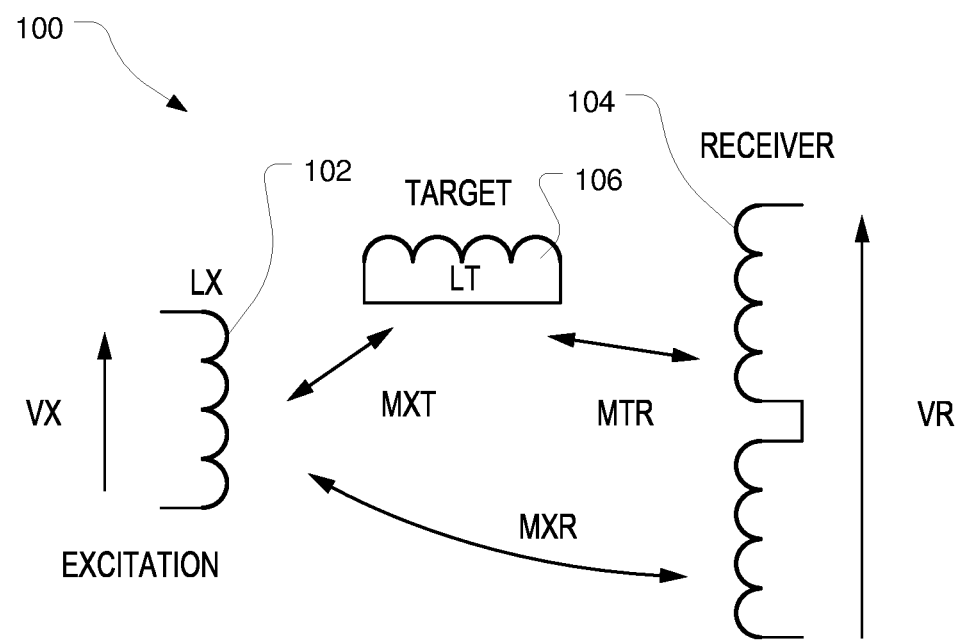
FIG. 1 is a schematic representation of a conventional linear inductive position sensor.
Figure 2:
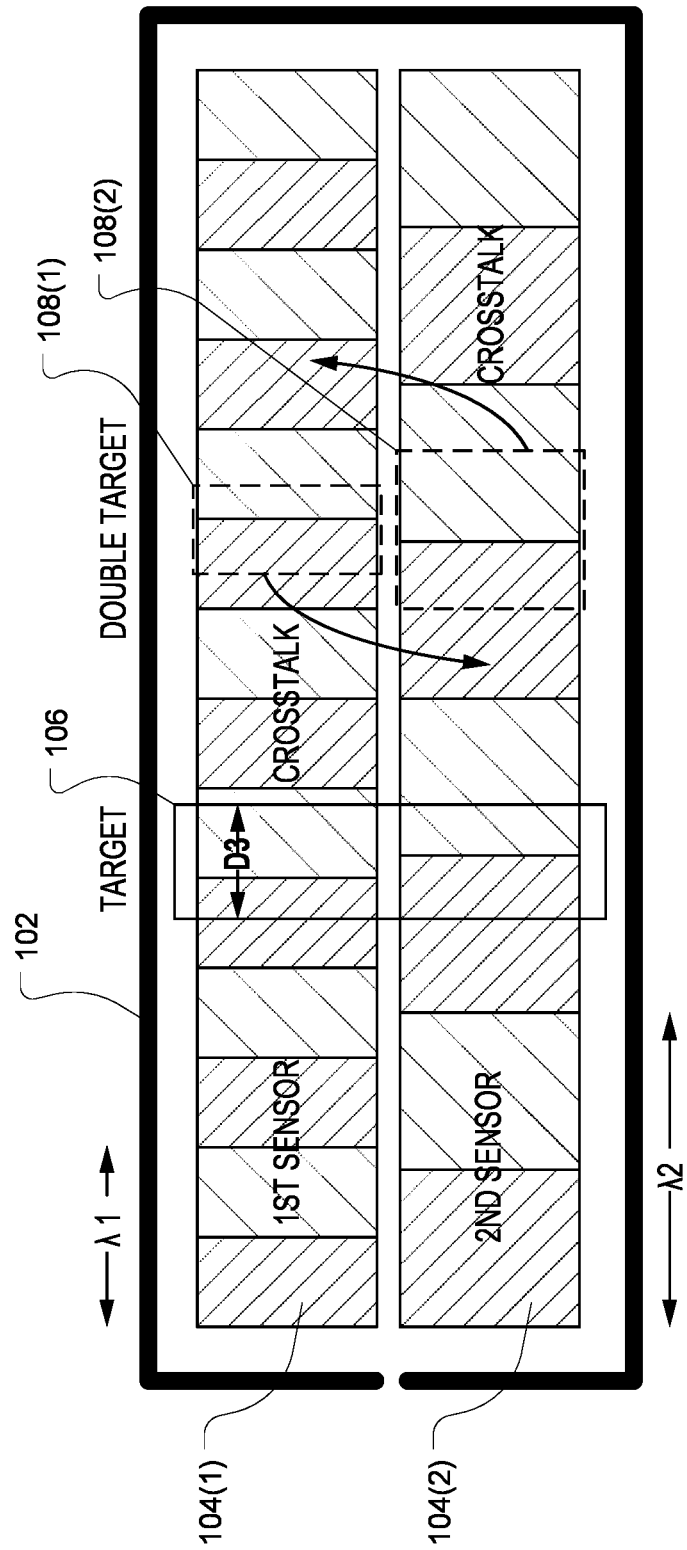
FIG. 2 is a schematic representation of a conventional multiple target linear sensor arrangement.
Figure 3B:
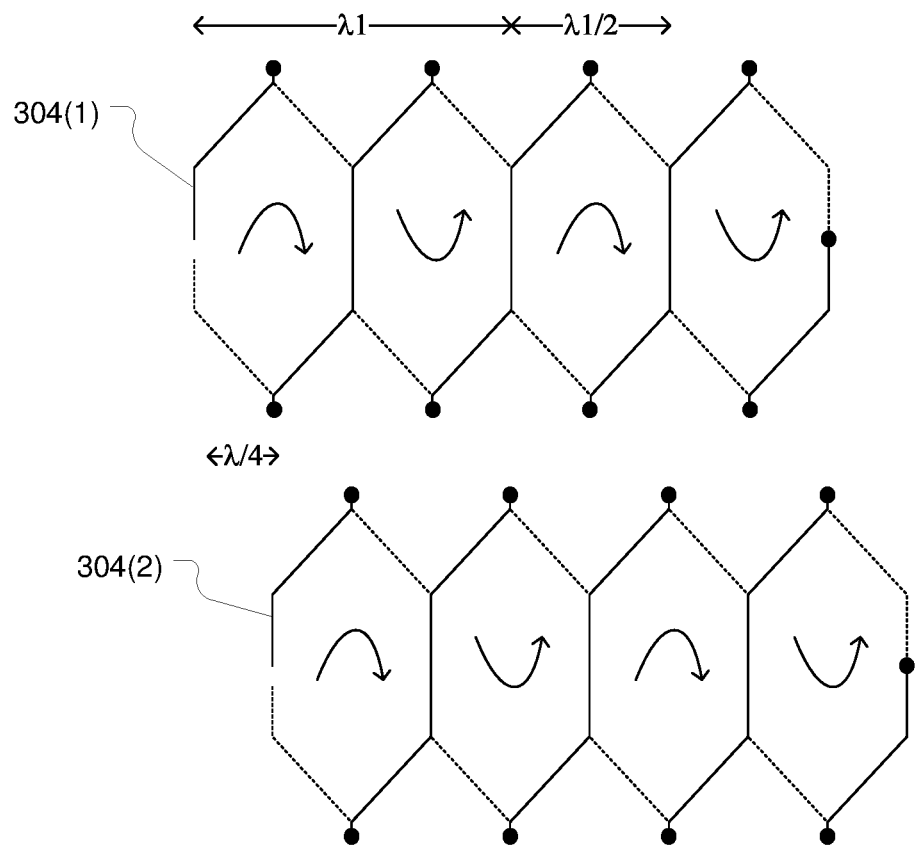
FIG. 3B is a schematic representation of a linear position sensor having two receiver coils and as configured in accordance with at least one implementation of the present disclosure.

As shown in FIG. 3B, an implementation may utilize two receiver coils 304(1) and 304(2). The receiver coils 304 are printed over a distance corresponding to a period $\lambda$ for the receiver coil 304. The second receiver coil 304(2) may be shifted from the first receiver coil 304(1) by one-quarter of a period ($\lambda/4$) along the PCB and thereby form a sine-cosine pair with the first receiver coil 304(1). To cancel out even harmonics, the receiver coils 304(1) and 304(2) have a twisted loop configuration. Any desired length may be used for a receiver coil 304, such as $2\lambda \ldots n\lambda$ (where "n" is an integer). The receiver coils 304 are printed onto and through the PCB using known processes and in a symmetrical twisted loop design. Each receiver coil 304 may be formed such that a complete symmetrical loop occurs over a distance $\lambda$ along the X axis of the PCB. For at least one implementation, $\lambda=6$ mm (six millimeters). Other distances for $\lambda$ may be used for other implementations. By using symmetrical loops, even harmonics of a given sensor transfer function may be minimized.

Figure 3C:
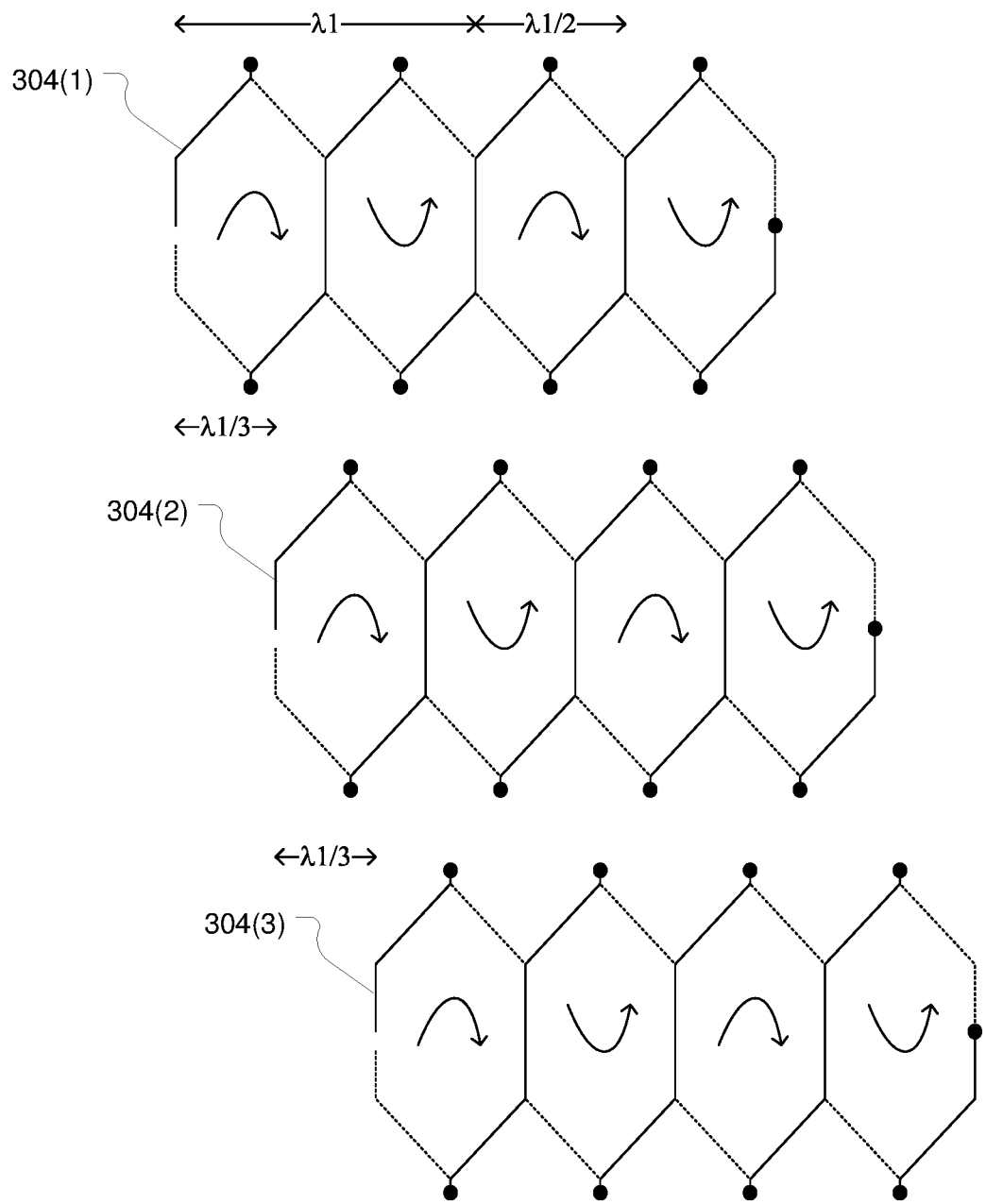
FIG. 3C is a schematic representation of a linear position sensor having three receiver coils and as configured in accordance with at least one implementation of the present disclosure.

As shown in FIG. 3C, an implementation may include three receiver coils 304(1), 304(2) and 304(3). When three receiver coils are utilized, the receiver coils may be shifted from another coil by one-third of a period ($\lambda/3$). The receiver coils 304 may include a twisted loop configuration and have a given length. The three receiver coils 304(1), 304(2) and 304(3) form a 3-phase system transfer function, where difference between any two phases negate third harmonics arising in a transfer function for a single given phase. It is to be appreciated that a twisted loop configuration minimizes the reception, by the receiver coil 304, of unintended electromagnetic fields and waves.

Figure 3D:
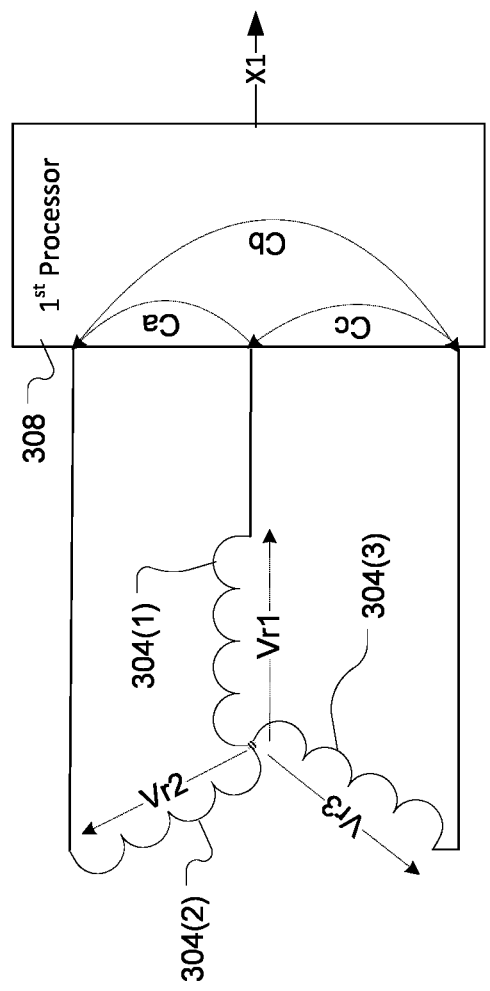
FIG. 3D is an electrical schematic representation of the linear position sensor of FIG. 3C and as configured in accordance with at least one implementation of the present disclosure.

In FIG. 3D, the receiver coils 304(1), 304(2) and 304(3) may be offset by one-hundred and twenty degrees (120 deg.). Accordingly, a third harmonic received in each receiver coil 304 is offset by 3*120 deg. When each receiver coil 304 has the same phase and are configured with the same geometry, the third harmonics will have the same amplitude and, due to being offset by 3*120 deg., will cancel while the fundamental signal is not cancelled when measuring the voltage difference between two receiver coils. Accordingly, per FIG. 3C and an implementation where three receiver coils 304(1), 304(2) and 304(3) are utilized, a received voltage that is not influenced by third harmonic signals may be sensed by a control circuit.

Figure 3E:
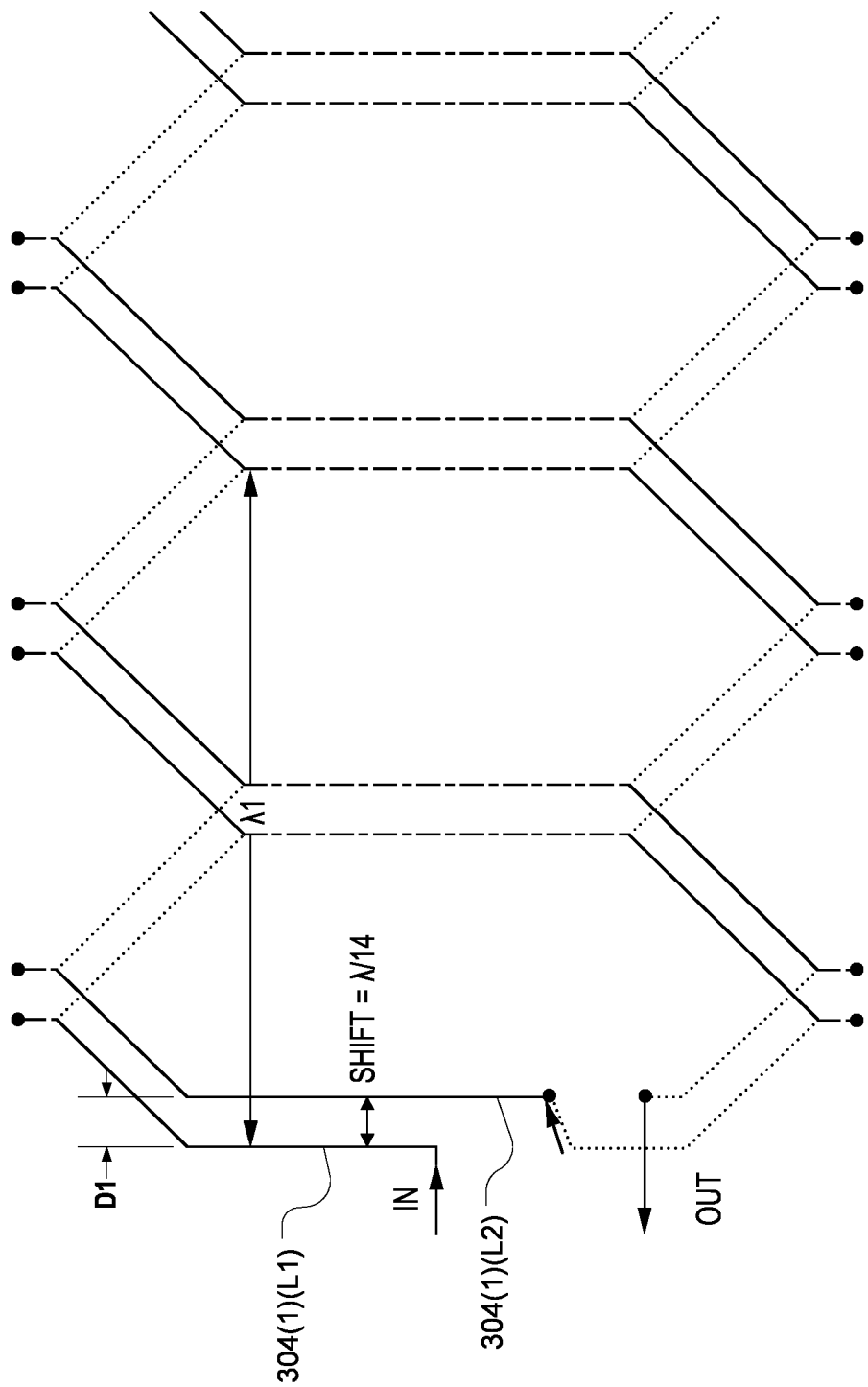
FIG. 3E is an enlarged view of a portion of the schematic representation of an implementation of a receiver coil having two loops for the linear position sensor of FIG. 3A and as configured in accordance with at least one implementation of the present disclosure.

In FIG. 3E, a portion of the linear position sensor 300 is shown, in an enlarged view, as indicated by section lines E-E in FIG. 3A. As shown with respect to, but not limited to, the first receiver coil 304(1), the first receiver coil 304(1) may include two or more receiver coil loops, such as a first receiver coil first loop 304(1)(L1) and a first receiver coil second loop 304(1)(L2). Any number of loops may be utilized and for an implementation. A loop of a given receiver coil 304 may be shifted a first distance D1 along the X-axis of the linear position sensor 300. For an implementation, $D1=\lambda/14$.

Figure 3F:
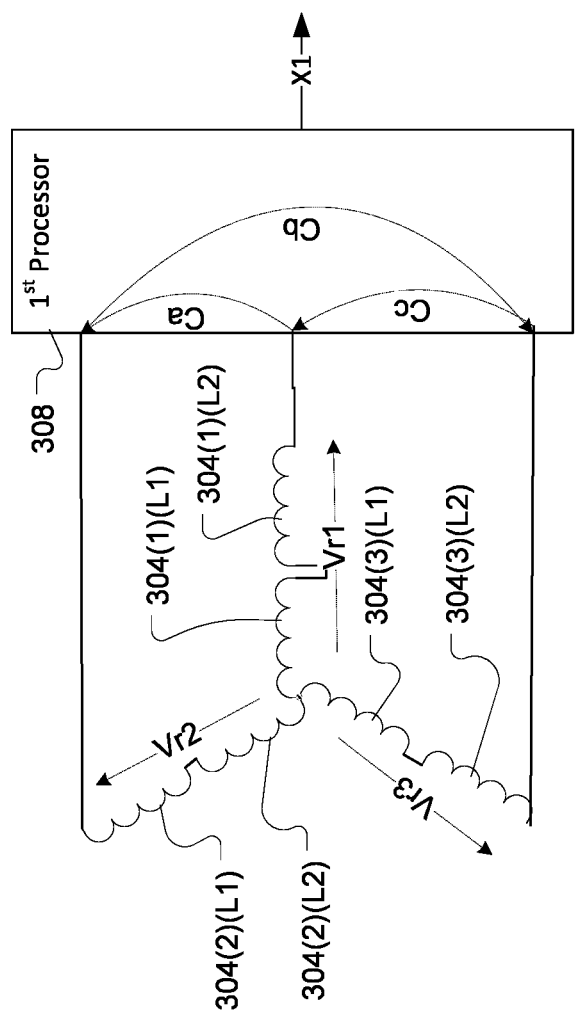
FIG. 3F is an electrical schematic representation of the linear position sensor of FIG. 3E and as configured in accordance with at least one implementation of the present disclosure.

As shown in FIG. 3F, the multi loop implementation of FIG. 3E may be used with the multiple coil implementation of FIG. 3C such that a second receiver coil 304(2) may include a second receiver coil first loop 304(2)(L1) and a second receiver coil second loop 304(2)(L2) and a third receiver coil 304(3) may include a third receiver coil first loop 304(3)(L1) and a third receiver coil second loop 304(3)(L2). As per FIG. 3E, the second loop (L2) may be offset by a distance $\lambda/14$ form a corresponding first loop (L1) of a given receiver coil 304. It is to be appreciated that a receiver coil 304 when so configured per the implementation of FIG. 3F may result in a doubling of a fundamental signal and a cancellation of seventh harmonic signals.

The excitation coil 302 and receiver coils 304 may be printed, deposited, or otherwise formed on and in the PCB or other substrate using any known or desired compounds, such as copper, aluminum, gold, or others. In accordance with at least one implementation, the receiver coils 304 may be printed on the PCB with vias being used to connect different portions of the coils, as such different portions may be printed on different faces or layers of the PCB. The use of vias to connect PCB portions is well known in the art.

The target coil 306 may be fabricated on a target core (not shown) of any desired substance, such as a PCB or other substrate. The target coil 306 includes a conductive material that may be configured in a coil or any other conductive shape. The target coil 306 may be sized and configured to facilitate the detection of any desired range of linear movements of the target coil 306 across the given axis of the linear position sensor 300. For an implementation, the target coil 306 may include a twisted loop design. When a multi-layer PCB or similar material is used as a target core (not shown), the target coil 306 may include two or more twisted loops drawn between each of a top layer and a bottom layer of the target core. The target coil 306 generates a second electromagnetic field when the target coil 306 is inductively coupled to the excitation coil 302.

For at least one implementation, a transfer function defining a relationship between the excitation voltage Vx and the receive voltage Vr may be expressed mathematically as per Equation 1:

$$V_r = \left( \frac{M_{xr}}{L_x} - \frac{M_{xt}(Z)M_{tr}(Z, \pi(x/\lambda))}{L_t L_x} \right) V_x \qquad \text{Equation 1}$$

Where, Lx and Lt are constants and Mxr, which represents the direct coupling on the PCB between the excitation coil and the receiver coils, is also a constant. Further, Mxt is a function of the target to PCB air gap Z and Mtr is a function of both the air gap Z and the target position along the given axis formed by excitation coil 302 printed onto the PCB. For at least one implementation, Z=0.5 mm (one-half of a millimeter).

Further and as shown above, Mtr can be approximated as the product of two functions, F(z) and M($2\pi x/\lambda$), with the latter ideally being a pure sine or cosine. Since the receiver coil 304 is printed on the PCB with multiple loops shifted on the PCB by precise lengths, Mxr may be negligible and positions of the target coil 306 along the given axis can be determined using the arctangent of the ratio of the received signals.

As further shown in FIGS. 3D and 3F, a first processor 308 may be coupled to the receiver coils 304 and measure two values (for a two phase system, not shown) or three values (for a three phase system, as shown): Ca=Vr1−Vr2; Cb=Vr2−Vr3; and Cc=Vr3−Vr1. It is to be appreciated, for a two-phase system, Vr1=A sin ($2\pi x/k$) and Vr2=A cos($2\pi x/\lambda$), with $2\pi x/\lambda$=atan(Vr1/Vr2). For a three-phase system, Vr1=A*sin($2\pi x/\lambda$), Vr2=A*sin($2\pi(x/\lambda+1/3)$)) and Vr3=A*sin($2\pi(x/\lambda+2/3)$)). The sine and cosine may be obtained using the commonly known alpha-beta transformation (which is also known as a Clarke transformation). Based on the values of Vr1, Vr2 and Vr3, a first position signal X1, calculated as an arctangent of the Ca, Cb and Cc values, is generated and output by the first processor 308.

Figure 4A:
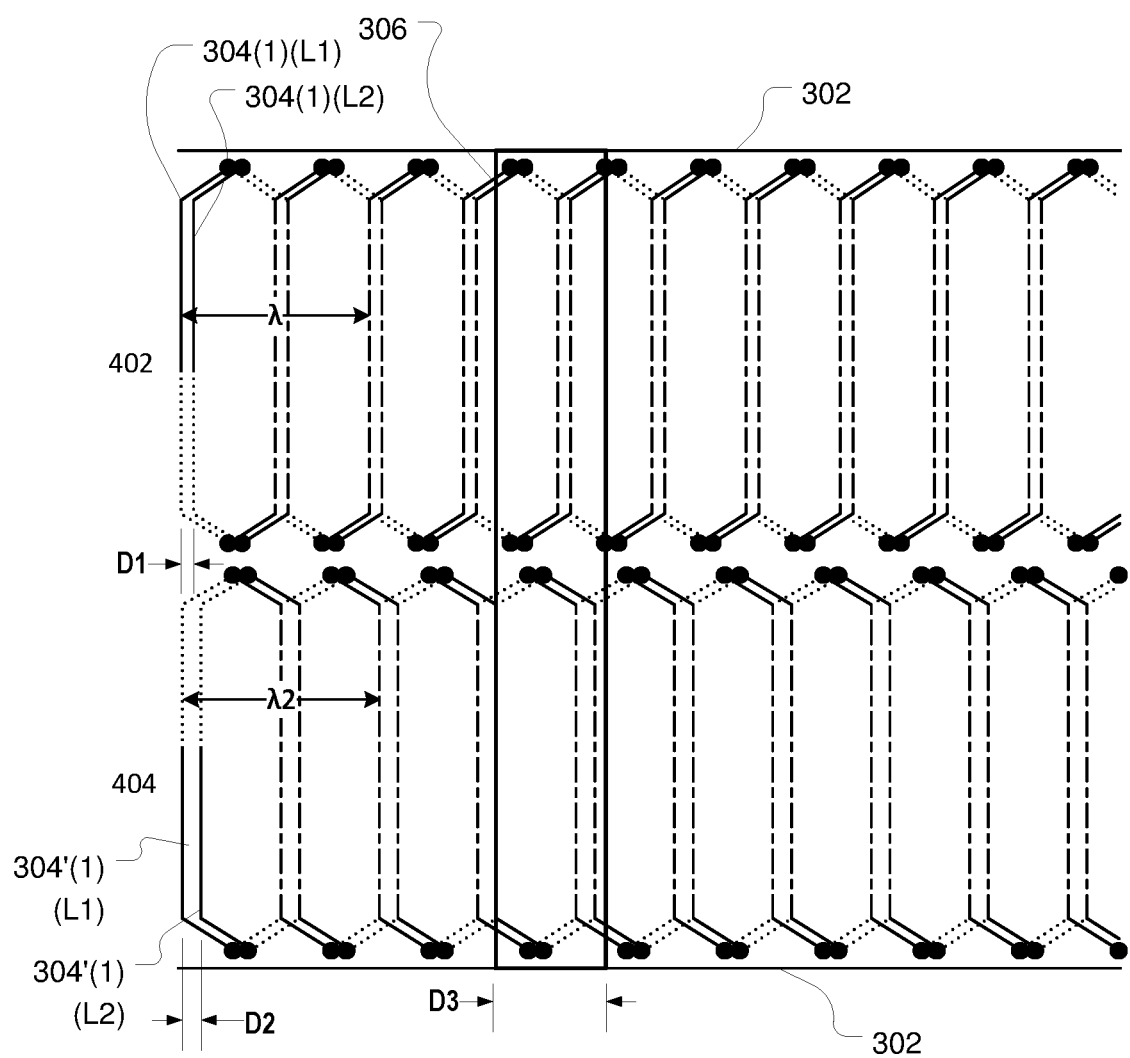
FIG. 4A is a schematic representation of a linear position sensor having two sensor circuits and as configured in accordance with at least one implementation of the present disclosure.
Figure 4B:
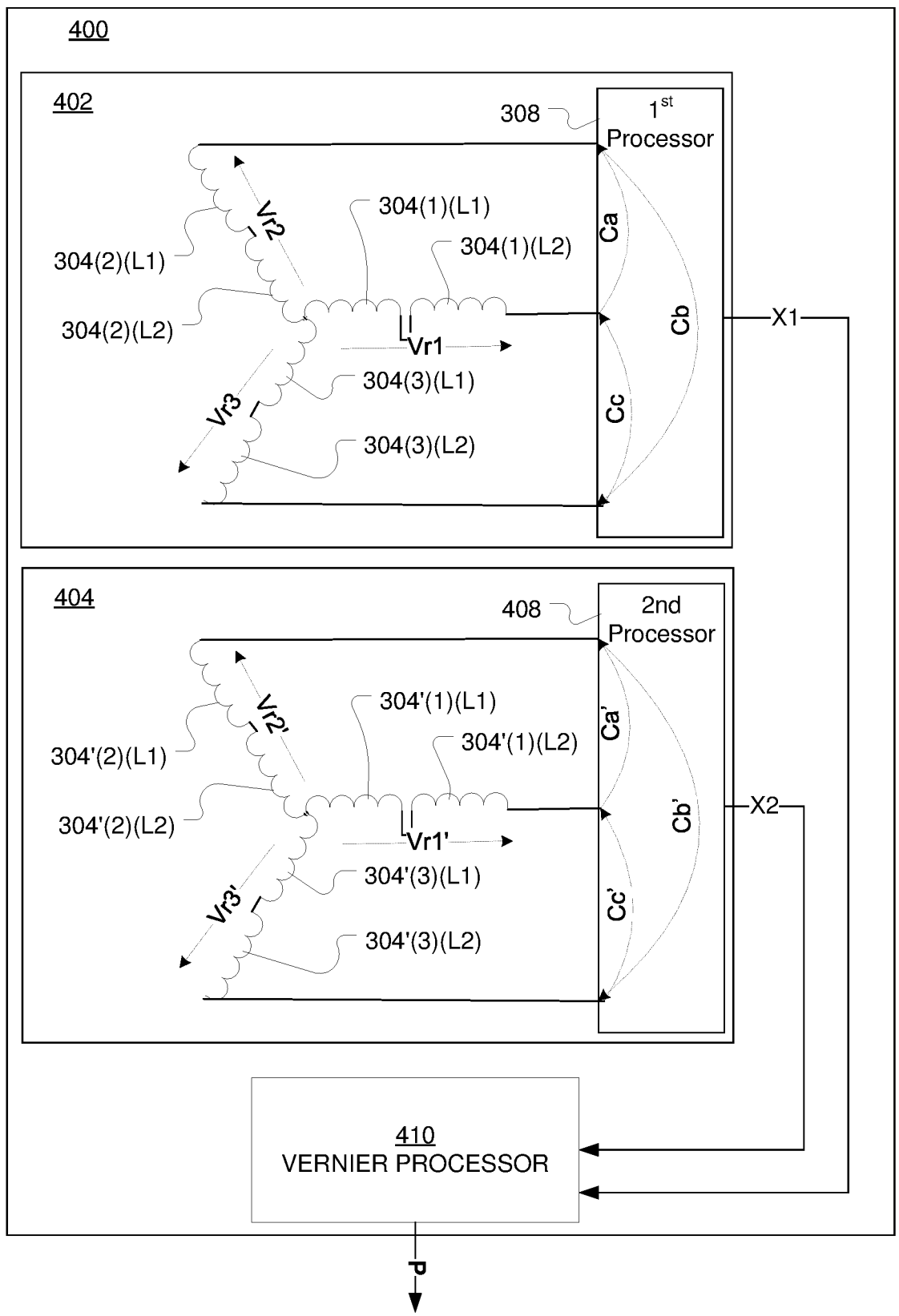
FIG. 4B is an electrical schematic representation of a linear position sensor having two sensor circuits and as configured in accordance with at least one implementation of the present disclosure.

As shown in FIGS. 4A and 4B and for another implementation of the present disclosure, a dual sensor linear position sensor 400 may include two sensors including a first sensor 402 and a second sensor 404. The first sensor 402 and the second sensor 404 may include a receiver coils with multi loop designs where each successive loop is shifted a given distance relative to the preceding loop, as described above with reference to FIGS. 3A-3F. In FIGS. 4A and 4B, the second sensor 404 is shown to include a three coil, multi-loop configuration. Herein, the coils and loops are identified by the designators 304'(coil #)(loop #), e.g., 304'(1)(L1). The period of the coils 304 and 304' may respectively correspond to the first period λ and the second period λ2. For at least one implementation, the first sensor 402 may have a first period λ=6 mm and the second sensor 404 may have a second period λ2=6.3 mm.

By using a two sensor design, as shown in FIGS. 4A and 4B, each of the sensors 402 and 404 including multiple coils 304( ) and 304'( ). The coils 304/304' further include multiple loops (L1), (L2) and (L3). For the first sensor 402, the loops for a given coil are offset by the first distance D1. For the second sensor 404, the loops for a given coil are offset by a second distance D2. Using such offsets between the loops (Ln), harmonics otherwise present in the Mtr transfer functions may be minimized, thereby facilitating generation of a high accuracy position signal P by the dual sensor linear position sensor 400. For at least one implementation, a high accuracy position signal P is a position that is determined to be within +/−0.5 millimeters of an actual position of the target along the given axis. For an implementation, λ≠λ2. For an implementation, D1=λ/14 and D2=λ2/10. For at least one implementation, the accuracy of the linear position sensor 300 is determinable based on the period of the sensor, as represented by the first period λ and the second period λ2.

For at least one implementation, the target width (D3) of the target coil 306 may be determined based upon the first period λ and the second period λ2. For an implementation, D3 satisfies both of the conditions in Equation Set 2.

$D3=\lambda*(3/5)$ and $D3=\lambda2*(4/7)$.        Equation Set 2

Per Equation Set 2 and for at least one implementation, λ=6 mm (six millimeters), λ2=6.3 mm (six-point three millimeters), and the width D3 of the target coil 306 equals three-point six millimeters (D3=3.6 mm). For at least one implementation, the dimensions λ, λ2 and D3 may be determined based upon computer simulations to find an optimal value for each.

As shown in FIG. 4B, the first processor 308 generates and outputs the first position signal X1 and the second processor 408 likewise generates and outputs a second position signal X2. The first position signal X1 and the second position signal X2 are provided to a Vernier processor 410 which generates (as described below) and outputs a final position signal P. The final position signal P is provided to other control units used in conjunction with, and not otherwise described herein, a given implementation of the present disclosure.

As shown in FIG. 5, the Vernier principle may be used to determine the position of the target along the dual sensor linear position sensor 400 in view of the first period λ and the second period λ2. In FIG. 5, the first position signal X1 and the second position signal X2 are depicted. As the target moves along the sensors, the positions X1 (for the first sensor 402) and X2 (for the second sensor 404) change, with X1 repeating three times for the first period k and X2 repeating for times for the second period λ2. Corresponding voltages are sensed as the target moves along the sensor, sine and cosine—functions of the position—are calculated, and the arctangent thereof result in a given position signal (X1 or X2) scaled between zero (0) and one (1), as shown on the Y axis in FIG. 5. It is to be appreciated that per the Vernier principle, an accurate measurement of a given distance of an object from a reference point may be made by using two measurements, which form a unique pair for a given position of the target coil 306 along the given axis. Based upon the values of the position signals X1 and X2, the position of the target coil 306 on the given axis can be uniquely determined by the Vernier processor 410. For example, when X2=1.0 and X1=0.75, the target coil 306 is located at position A along the X axis of the dual sensor linear position sensor 400. Similarly, when X2=1.0 and X1=0.5, the target coil 306 is located at position B along the X axis of the linear position sensor 300. Similarly, when X2=0.9 and X1=0.15, the target coil 306 is located at position C along the X axis of the dual sensor linear position sensor 400. It is to be appreciated that the scale may be measured in any increments, with the range of 0 to 1 being depicted in FIG. 5 for illustrative purposes and across any given range such as 0 to 1.0 with the range corresponding to a gradation of a length of the given axis (such as the X axis) of the dual sensor linear position sensor 400. For an implementation, the control unit is configured to measure voltages received by each sensor and convert such voltages into a relative position.

Figure 6:
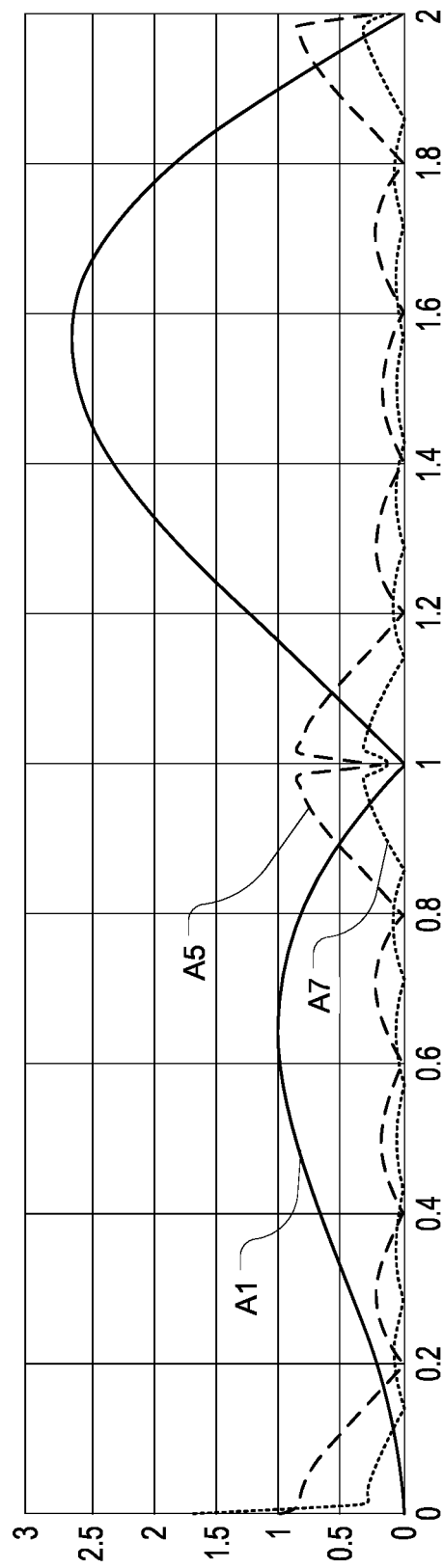
FIG. 6 is a chart illustrating fundamental amplitudes as a function of a relative width of a target coil to the wavelength of the receiver coil as generated by the linear inductive position sensor of FIG. 4 and in accordance with at least one implementation of the present disclosure.

As shown in FIG. 6, relationships between a fundamental amplitude A1, a fifth harmonic amplitude A5, and a seventh harmonic amplitude A7 are shown, as modeled for the linear inductive position sensor of FIG. 4, and as determined based on a relative target width DR ranging from zero (O) to two (2), where DR=D3/λ). As shown, A5 is null when D3=λ*(p/5), where p=0, 1, 2, etc., and A7 is null when D3=λ*(q/5), where q=0, 1, 2, etc. Accordingly, it is to be appreciated that for the linear position sensor of FIG. 4, D3 can be defined by Equation Set 3.

$$D3=\lambda^*(p/5)=\lambda 2^*(q/7); \text{ or}$$

$$7p\lambda=5q\lambda 2 \text{(when } p\neq 0,5,15, \text{ etc. and } q\neq 0,7,14, \text{ etc.)} \quad \text{Equation Set 3}$$

Using Equation Set 3, it can be seen that when p=3 and q=4, then 21 λ=20 λ2. Accordingly, the Vernier has 21 periods for the first receiver coil 402 and 20 periods for the second receiver coil 404.

Figure 7:
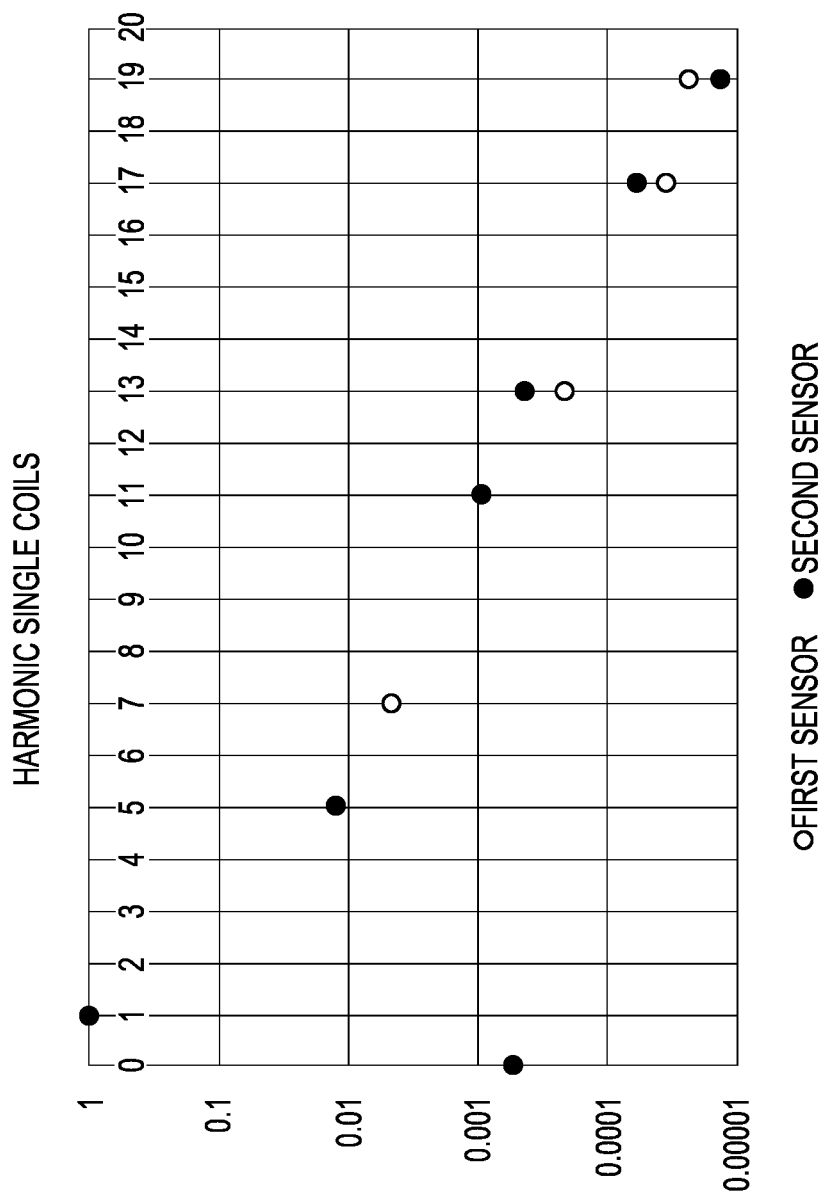
FIG. 7 is a chart illustrating relative signal strengths of harmonics generated by a single coil implementation of the linear inductive position sensor of FIGS. 3A-3B and in accordance with at least one implementation of the present disclosure.
Figure 8:
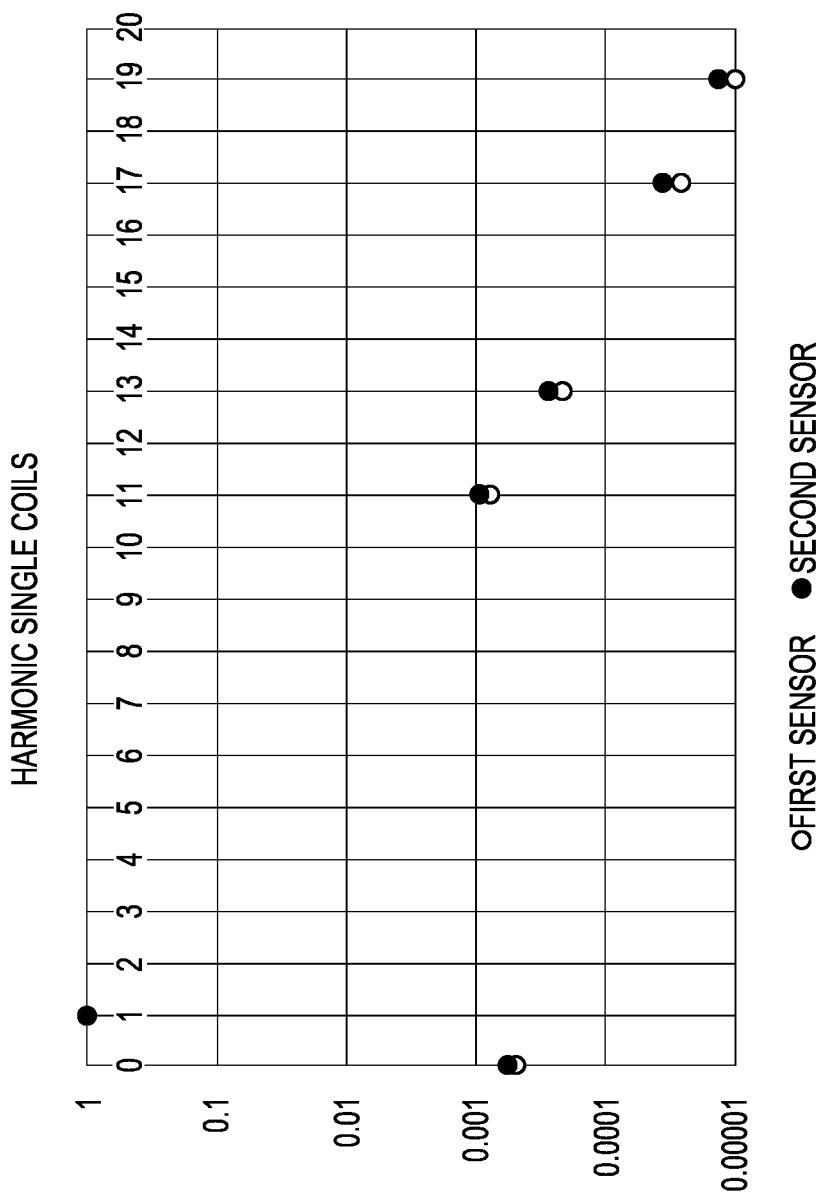
FIG. 8 is a chart illustrating relative signal strengths of harmonics generated by a multiple, in series electrical arrangement, coil implementation of the linear inductive position sensor of FIG. 4 and in accordance with at least one implementation of the present disclosure.

As shown in FIG. 7, since D3=(3/5)*λ, the fifth harmonic is canceled in the transfer function between the target coil 306 and the first receiver coil 302. As shown in FIG. 7, since D3=(4/7)*λ2, the seventh harmonic is canceled by the second receiver coil 404. Accordingly, by using the linear receiver coil implementation of FIGS. 3C, 3E, 4A and 4B, the seventh and fifth harmonics may be nullified in the first sensor 402 and in the second sensor 404. Further, when using a 3-phase system for the receiver coils each of the third, fifth and seventh harmonics and their respective multiples may be nullified as shown in FIG. 8. It is to be appreciated that such nullification of these harmonics facilitate closer placements (i.e., a smaller air gap Z) of the target coil 306 relative to the top surface of the PCB used for the excitation coil 302 and the receiver coils 304/304' and thereby greater sensitivity and accuracy of the dual sensor linear position sensor 400 to movements of the target coil 306.

In summary, the following harmonics are cancelled when a three-phase implementation of the present disclosure is utilized, with remaining harmonics (such as the 11th, 13th, $17^{th}$, $19^{th}$, etc.) having negligible influence, if any.

Even Harmonics:
　Cancelled due to use of twisted loop geometry in the receiver coils;

$3^{rd}$ Harmonics (and Multiples Thereof):
　Cancelled due to measurement differences when a 3-phase system is utilized;

$5^{th}$ Harmonics:
　Cancelled in sensor 1 due to D3=(3/5)*λ; and
　Cancelled in sensor 2 due to spacing between coils in series=(1/10)*λ2; and $7^{th}$ Harmonics:
　Cancelled in sensor 1 due to spacing between coils in series=(1/14)*λ; and
　Cancelled in sensor 2 due to D3=(4/7)*λ2.

In summary, the following harmonics are cancelled when a two-phase implementation of the present disclosure is utilized.

Even Harmonics:
　Cancelled due to use of twisted loop geometry in the receiver coils;

$3^{rd}$ Harmonics (and Multiples Thereof):
　Cancelled in sensor 1 due to D3=(2/3)*λ; and
　Cancelled in sensor 2 due to spacing between coils in series=(1/6)*λ2;

$5^{th}$ Harmonics:
　Cancelled in sensor 1 due to spacing between coils in series=(1/10)*λ; and
　Cancelled in sensor 2 due to D3=(3/5)*λ2.

$7^{th}$, $9^{th}$, $11^{th}$, $13^{th}$, $17^{th}$, $19^{th}$, etc. Harmonics: Not cancelled.

Further, it is to be appreciated that coupling may occur between leads used to connect the excitation coil and receiver coils to the control unit. Such coupling may be addressed by implementing one or more concepts disclosed in U.S. patent application Ser. No. 16/112,221, filed on Aug. 24, 2018, in the name of inventor Jacques Jean Bertin, entitled "Devices, Systems and Methods for Determining and Compensating for Offset Errors Arising in Inductive Sensors," and which issued as U.S. Pat. No. 11,112,275 on Sep. 7, 2021—the entire contents of which are incorporated herein by reference.

Although various implementations of the claimed invention have been described above with a certain degree of particularity, or with reference to one or more individual implementations, those skilled in the art could make alterations to the disclosed implementations without departing from the spirit or scope of the claimed invention. The use of the terms "about," "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "before," "after," and other similar terms are used for description and ease of reference purposes only and are not intended to be limiting to any orientation or configuration of any elements or sequences of operations for the various implementations of the present disclosure. Further, the terms "and" and "or" are not intended to be used in a limiting or expansive nature and cover any range of combinations of elements and operations of an implementation of the present disclosure. Other implementations are therefore contemplated. It is intended that all matter contained in the above description and shown in the accompanying drawings shall be interpreted as illustrative only of implementations and not limiting. Changes in detail or structure may be made without departing from the basic elements of the invention as defined in the following claims.

What is claimed is:

1. A linear inductive position sensor, comprising:
　an excitation coil extending along an axis of a substrate, the excitation coil generating a first electromagnetic field in response to an alternating current (AC) signal received from a power source;
　a target coil configured to move above the excitation coil and along the axis, the target coil inductively coupled to the excitation coil and generating a second electromagnetic field;
　a first sensor extending along the axis, the first sensor including a first receiver coil and a second receiver coil inductively coupled to the target coil so as to generate a first voltage in the first receiver coil and a second voltage in the second receiver coil depending on a position of the target coil relative to the axis, the first receiver coil being separated from the second receiver coil by a distance based on a period λ of the first receiver coil; and a first processor coupled to the first sensor, the first processor configured to generate a position signal based on the first voltage and the second voltage, the position signal representing the position of the target coil.

2. The linear inductive position sensor of claim 1, wherein the excitation coil extends in a multi-loop configuration around a perimeter of the substrate.

3. The linear inductive position sensor of claim 1, wherein the excitation coil encloses the first receiver coil and the second receiver coil.

4. The linear inductive position sensor of claim 1, wherein the first receiver coil includes a first plurality of loops, and the second receiver coil includes a second plurality of loops.

5. The linear inductive position sensor of claim 4, wherein first and second loops of the first plurality of loops are offset from one another by a distance D1.

6. The linear inductive position sensor of claim 5, wherein $D1=\lambda/14$.

7. The linear inductive position sensor of claim 6, wherein even numbered harmonics generated in the first voltage and the second voltage are nullified.

8. The linear inductive position sensor of claim 4, wherein;
the first sensor further includes a third receiver coil inductively coupled to the target coil so as to generate a third voltage in the third receiver coil, depending on a position of the target coil relative to the axis,
the third receiver coil includes a third plurality of loops of which each loop is offset from a corresponding loop of the first plurality of loops and a corresponding loop of the second plurality of loops by a distance $\lambda/3$, and
the position signal is additionally based on the third voltage.

9. The linear inductive position sensor of claim 1, further comprising:
a second sensor extending along the axis, the second sensor including first and second receiver coils inductively coupled to the target coil so as to generate a voltage Vr1' in the first receiver coil of the second sensor and voltage Vr2' in the second receiver coil of the second sensor, depending on a position of the target coil relative to the axis, the first and second receiver coils of the second sensor being separated by a distance based on a period $\lambda 2$ of the second receiver coil of the second sensor; and
a second processor coupled to the second sensor, the second processor configured to generate a position signal X2 based on the voltage Vr1' and the voltage Vr2', the position signal X2 representing the position of the target coil.

10. The linear inductive position sensor of claim 9, wherein:
the first receiver coil of the second sensor includes a first plurality of loops in a twisted loop configuration, and
the second receiver coil of the second sensor includes a second plurality of loops in a twisted loop configuration.

11. The linear inductive position sensor of claim 10, wherein;
the second sensor further includes a third receiver coil inductively coupled to the target coil so as to generate a voltage Vr3' in the third receiver coil of the second sensor, depending on a position of the target coil relative to the axis,
the third receiver coil includes a third plurality of loops of which each loop is offset from a corresponding loop of another at least one of the first receiver coil or the first receiver coil by a distance $\lambda/3$, and
the position signal X2 is additionally based on the voltage Vr3'.

12. The linear inductive position sensor of claim 11, wherein first and second loops of the first plurality of loops are offset from one another by a distance D2.

13. The linear inductive position sensor of claim 12, wherein first and second loops of the second plurality of loops are offset from one another by the distance D2.

14. The linear inductive position sensor of claim 12, wherein $D2=\lambda 2/10$ and the target coil has a width $D3=3/5 \lambda=4/7 \lambda 2$.

15. The linear inductive position sensor of claim 14, wherein odd numbered harmonics generated in the voltage Vr1', the voltage Vr2', and the voltage Vr3' are nullified.

16. A linear inductive position sensor, comprising:
an excitation coil extending along an axis of a substrate;
a target coil configured to move above the excitation coil and along the axis, the target coil inductively coupled to the excitation coil when the excitation coil is provided with an alternating current, the target coil having a width;
a first sensor having a first plurality of receiver coils offset from one another by a distance $\lambda$, each receiver coil of the first plurality of receiver coils being inductively coupled to the target coil and including a first plurality of twisted loops, wherein a first twisted loop of the first plurality of twisted loops is offset from a second twisted loop of the first plurality of twisted loops by a first distance;
a second sensor having a second plurality of receiver coils offset from one another by a distance $\lambda 2$, each receiver coil of the second plurality of receiver coils being inductively coupled to the target coil and including a second plurality of twisted loops, wherein a first twisted loop of the second plurality of twisted loops is offset from a second twisted loop of the second plurality of twisted loops by a second distance;
a first processor configured to generate a first position signal representing a position of the target coil, from a first set of voltages induced in the first plurality of receiver coils;
a second processor configured to generate a second position signal representing a position of the target coil, from a second set of voltages induced in the second plurality of receiver coils; and
a processor coupled to the first processor and the second processor, the processor configured to generate a final position signal using a Vernier principle, the final position signal representing a position of the target coil that is based on the first position signal X1 and the second position signal.

17. The linear inductive position sensor of claim 16, wherein width depends on the distance $\lambda$ and the distance $\lambda 2$.

18. The linear inductive position sensor of claim 16, wherein the first processor cancels $3^{rd}$ and $5^{th}$ harmonics in the first set of voltages.

19. The linear inductive position sensor of claim 16, wherein the second processor cancels $3^{rd}$, $5^{th}$, and $7^{th}$ harmonics in the second set of voltages.

20. A method, comprising:
receiving a first position signal from a first processor, the first position signal representing a position of a target coil, based on a first set of voltage signals generated by a first sensor;

receiving a second position signal from a second processor, the second position signal representing a position of the target coil, based on a second set of voltage signals generated by a second sensor; and determining the position of the target coil from the first position signal and the second position signal using a Vernier principle, wherein third harmonics are cancelled from the first set of voltage signals, fifth harmonics are cancelled from the second set of voltage signals, and the target coil is sized to nullify seventh harmonics from at least one of the first set of voltage signals and the second set of voltage signals.

* * * * *